United States Patent [19]

Hirohata

[11] Patent Number: 4,668,145
[45] Date of Patent: May 26, 1987

[54] FASTENER FOR COUPLING TOGETHER TWO PANELS IN FACE-TO-FACE RELATION

[75] Inventor: Toshio Hirohata, Yokohama, Japan

[73] Assignee: Nifco, Inc., Yokohama, Japan

[21] Appl. No.: 876,237

[22] Filed: Jun. 19, 1986

[30] Foreign Application Priority Data

Jul. 15, 1985 [JP] Japan .................................. 60-154147

[51] Int. Cl.⁴ .............................................. F16B 13/04
[52] U.S. Cl. ........................................ 411/508; 411/71; 411/45
[58] Field of Search .................. 411/57, 60, 71, 72, 411/73, 74, 45, 508

[56] References Cited

U.S. PATENT DOCUMENTS

| | | | |
|---|---|---|---|
| 3,988,808 | 11/1976 | Poe et al. | 411/57 X |
| 4,176,428 | 12/1979 | Kimura | 411/57 X |
| 4,360,301 | 11/1982 | Mosberger | 411/57 |

FOREIGN PATENT DOCUMENTS

| | | | |
|---|---|---|---|
| 2114596 | 11/1971 | Fed. Rep. of Germany | 411/57 |
| 2129218 | 12/1971 | Fed. Rep. of Germany | 411/72 |
| 2029407 | 12/1971 | Fed. Rep. of Germany | 411/72 |
| 2454022 | 5/1976 | Fed. Rep. of Germany | 411/71 |
| 2917706 | 11/1980 | Fed. Rep. of Germany | 411/71 |
| 1342218 | 9/1963 | France | 411/71 |
| 56-31444 | 7/1981 | Japan . | |
| 480551 | 12/1969 | Switzerland | 411/72 |

Primary Examiner—Thomas J. Holko
Attorney, Agent, or Firm—Trexler, Bushnell, Giangiorgi & Blackstone, Ltd.

[57] ABSTRACT

A fastener comprises two, i.e. male and female, members for coupling together a plurality of panels in a spaced-apart and face-to-face relation to one another. The female member has a locking body portion and also has locking pawl portions united by hinge portions to the locking body portion for flexing with respect thereto. The male member is fitted in one of two panels and detachably coupled to the female member fitted in the other panel.

2 Claims, 5 Drawing Figures

FASTENER FOR COUPLING TOGETHER TWO PANELS IN FACE-TO-FACE RELATION

FIELD OF THE INVENTION AND RELATED ART STATEMENT

This invention relates to a fastener which consists of two, i.e. male and female, plastic members and can be effectively used for coupling together two panels, i.e. an interior trim board of a car passenger compartment and a car body panel, in a face-to-face relation to each other.

A fastener for coupling together two panels is disclosed in Japanese Patent Publication No. SHO 56-31444 and has been used in practice.

The present invention relates to improvements in the proposed fastener, and its object is to improve the stability of the mounting property of the female member and the coupling force with which the male and female members are coupled together.

To couple together two panels with the disclosed fastener, the male member is fitted in one of the panels by inserting its head portion consisting of two, i.e. main and auxiliary, flanges into a mounting hole formed in the panel. The female member is fitted in the other panel by forcibly inserting its locking body portion into a mounting hole formed in the panel until its mounting flange strikes the panel. Afterwards, the two members are coupled together by inserting a locking shaft portion of the male member into the locking body portion of the female member, whereby the two panels are coupled together in a face-to-face relation to each other.

In the above structure of the disclosed fastener, the female member is fitted in the mounting hole of the panel with its locking pawl portions provided on the outer periphery of the locking body portion hooked on the edge of the mounting hole. When the female member is inserted through the mounting hole, however, either the locking pawl portions are deformed to reduce the overall outer dimension of the locking body portion or the locking body portion is inwardly flexed by making use of the elasticity of the material. Therefore, the female member has to be inserted with a considerably strong force when it is fitted in the panel.

Further, since the locking pawl portions are provided directly on the outer periphery of the locking body portion, the locking body portion is more or less contracted when the female member is inserted through the mounting hole. Therefore, the force of coupling between a locking shaft portion of the male member and a locking body portion of the female member is subject to variations; that is, it is difficult to obtain uniform coupling between the male and female members. Further, the mounting force, with which the members are fitted in the panels, is subject to fluctuations.

OBJECT AND SUMMARY OF THE INVENTION

An object of the invention is to provide a fastener for coupling together two panels in a face-to-face relation to each other, which is improved in the property of insertion of the female member into a mounting hole of a panel to improve the mounting property, particularly permitting the fitting in a panel with a reduced inserting force, and can provide a strong locking force compared to the inserting force once the member is fitted so that a stable mounted state can be obtained.

To attain the above object of the invention, there is provided a fastener which comprises two, i.e. male and female, members, and in which the female member has a plurality of locking pawl portions provided like a door on the outer periphery of a locking body portion via a reduced thickness hinge portion extending in the longitudinal direction of the locking body portion outer periphery, each locking pawl portion having a free end portion normally outwardly projecting with respect to the locking body portion outer periphery owing to the elasticity of the material and also having a top engagement edge facing the lower surface of the mounting flange.

To couple together two panels with the fastener, the male member is fitted in one of the panels by inserting its head portion having two flanges into a mounting hole like a key hole formed in the panel. The female member is fitted in the other panel by inserting its locking body portion into a mounting hole formed in the other panel until its mounting flange strikes the panel surface. In this state, the two members are coupled together by forcibly inserting the locking body portion of the male member in the locking body portion of the female member, thus coupling together the two panels. Particularly, according to the invention at the time of fitting the female member in the panel the door-like locking pawl portions provided on the outer periphery of the locking body portion are inwardly flexed about the hinge portions. When the locking pawl portions clear the mounting hole, they are outwardly flexed about the hinge portions to restore to the initial state owing to the elastic restoring force. Thus, the top engagement edges of the locking pawl portions engage the lower surface of the panel and clamp the panel in cooperation with the mounting flange.

The above and other objects and features of the invention will become more apparent from the following detailed description with reference to the accompanying drawings.

DETAILED DESCRIPTION OF THE PREFERRED EMBODIMENT

Figure 1:
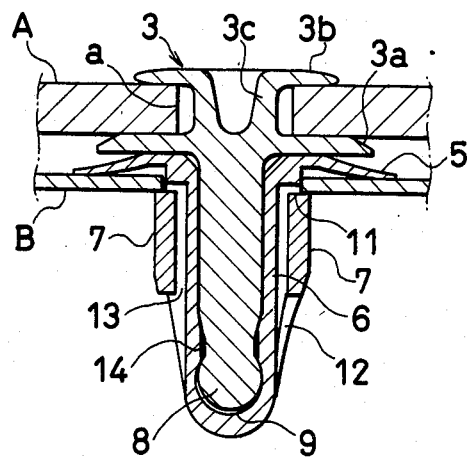
FIG. 1 is an axial sectional view showing an embodiment of the fastener according to the invention in a state in which two panels are coupled together in a face-to-face relation.
Figure 2:
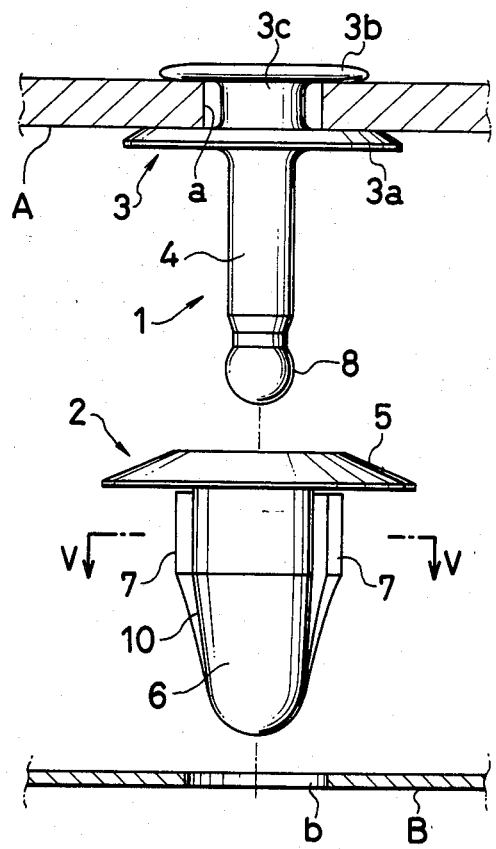
FIG. 2 is a front view showing the fastener with the male and female members shown separately before being coupled together.
Figure 3:
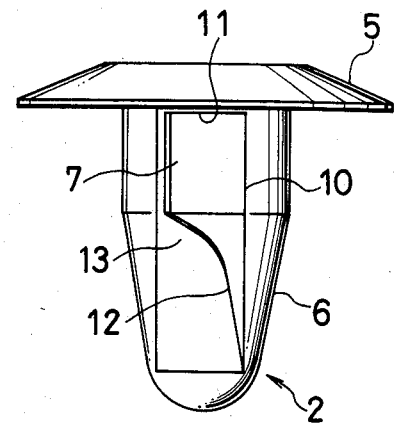
FIG. 3 is a side view showing the female member.
Figure 4:
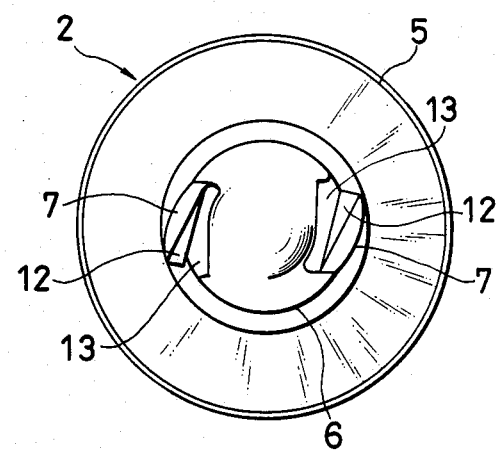
FIG. 4 is a bottom view showing the female member.
Figure 5:
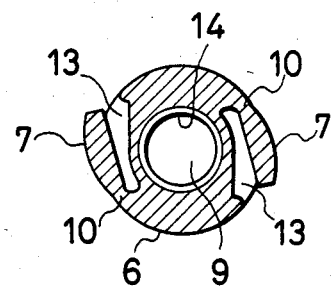
FIG. 5 is a sectional view taken along line V—V in FIG. 2.

Referring now to the Figures illustrating an embodiment of the invention, the fastener comprises a male member 1 and a female member 2. These members 1 and 2 are separate plastic moldings. In the instant case, they are molded from a polyethylene resin. The male member 1 has a head portion 3 and a locking shaft portion 4. The female member 2 has a mounting flange 5, a locking body portion 6 and elastic locking pawl portions 7.

The head portion 3 of the male member 1 has a large flange $3a$, a small flange $3b$ and a neck $3c$ between the flanges $3a$ and $3b$. The shaft portion 4 depends from the center of a lower surface of the head portion. It has a substantially spherical end 8.

The male member is secured to a panel A, e.g. a trim board, by forcing the head portion 3 into a mounting hole a which is formed in advance in the panel. The mounting hole a is just like a key hole consisting of two, i.e. large and small, sections. To fit the male member in the mounting hole a, the small flange 3b of the head portion is first inserted through the large diameter section (not shown) of the mounting hole. When the large flange 3a is brought into contact with the panel surface, the head portion is shifted to the small diameter section of the mounting hole to bring the small flange 3b into contact with the outer surface of the panel. Thus, the panel A is clamped between the large and small flanges of the male member secured to the panel. This method of securement is the same as for fasteners which have already been proposed, and is presently extensively practiced.

The locking body portion 6 of the female member 2 has a blind space open at one end, and it has a mounting flange 5 outwardly extending from the end of the outer periphery at the open end of the blind space.

The blind space of the locking body portion 6 has a size sufficient to receive the locking shaft portion 4 of the male member. The blind space has a substantially spherical bottom 9, in which the substantially spherical end 8 of the shaft portion 4 of the male member is received. The female member also has two diametrically opposed locking pawl portions 7 provided on the outer periphery of the locking body portion.

Each locking pawl portion 7 is like a door provided on the outer periphery of the locking body portion via a reduced thickness hinge portion 10 extending in the longitudinal direction of the locking body portion outer periphery. Its free end portion normally outwardly projects with respect to the locking body portion outer periphery owing to the elasticity of the material.

The locking pawl portions 7 have top engagement edges 11, which face and are parallel to the lower surface of the mounting flange 5. Each locking pawl portion 7 has a convex arcuate edge 12 extending from an intermediate portion of its outer end to the lower end of the hinge portion 10. In this embodiment, portions of the outer periphery of the locking body portion corresponding to the locking pawl portions 7 are formed with recesses 13. The locking pawl portions 7 can be flexed into and out of recesses 13.

The female member 2 having the above structure can be fitted in a panel B, e.g. an automotive body panel, by forcibly inserting its locking body portion 6 through a circular mounting hole b formed in the panel B until the mounting flange 5 strikes the surface of the panel B.

As the female member 2 is inserted through the mounting hole b, the locking pawl portions 7 provided on the outer periphery of the locking body portion are inwardly flexed into the recesses 13 by the edge of the mounting hole. When the locking pawl portions 7 clear the mounting hole, they are outwardly flexed to restore to their initial state owing to their elasticity. Their top engagement edges 11 are thus brought into engagement with the back surface of the panel and clamp the panel in cooperation with the mounting flange 5. In this way, the female member is fitted.

When the female member is inserted into the mounting hole, the convex arcuate edge 12 of each locking pawl portion 7 engages the edge of the mounting hole b first at the end thereof on the side of the hinge portion, and the point of engagement is shifted along the arcuate edge toward the other end thereof, thus causing inward flexing of the locking pawl portion to facilitate the insertion of the female member.

After the male and female members have been fitted in the respective panels A and B, the male and female members are coupled together by inserting the locking shaft portion 4 of the male member into the locking body portion 6 of the female member, whereby the two panels are coupled together in a face-to-face relation to each other. At this time, the locking shaft portion 4 is inserted by expanding a constricted portion 14 of the locking body portion with its substantially spherical end 8.

With the above construction of the fastener according to the invention, two panels can be coupled together in a face-to-face relation to each other by fitting the male and female members in the respective panels and then inserting the locking shaft portion 4 of the male member into the locking body portion of the female member. Particularly, with the fastener according to the invention the locking pawl portions 7, which lock the female member 2 to the panel B, are door-like and capable of flexing with respect to the hinge portion 10 provided on the outer periphery of the locking body portion and extending in the longitudinal direction thereof. Thus, the female member can be easily inserted to be fitted. Also, once the female member is fitted, it is held firmly secured to the panel and cannot be readily detached from the same.

More specifically, the inward or outward flexing of each locking pawl portion of the female member according to the invention is effected with respect to the hinge portion 10 extending in the longitudinal direction of the locking body portion, while the female member is locked to the panel not by the free end of the locking pawl portions but by the top engagement edges 11 thereof. Therefore, the locking of the member to the panel in no way depends on the repulsive force of the locking pawl members, so that it is possible to enhance the flexing property of the hinges 10 to facilitate the insertion of the female member without sacrificing the locking force with which the female member is locked to the panel. Further, the locking force, with which the engagement edges 11 engage the panel, is entirely independent of the flexing of the hinge portions but depends on the thickness and mechanical strength of the locking pawl portions themselves. Thus, it is possible to provide a high locking force.

Further, since the locking pawl portions are flexed and engage the panel with the insertion of the female member without influencing the locking body portion at all, the female member can be coupled to the locking shaft portion of the male member with a fixed coupling force irrespective of whether it is coupled to the male member before or after its fitting in the panel. Thus, when it becomes necessary to separate the two coupled panels, the male and female members can be decoupled by pulling out the locking shaft portion of the male member out of the locking body portion of the female member independently of the status in which the female member is fitted in the panel.

The above embodiment of the invention has been described in conjunction with a method of coupling together the two panels A and B by preliminarily fitting the male and female members 1 and 2 in these panels. It is also possible to couple together the two panels by preliminarily coupling together the male and female members, then fitting the head portion of the male member in the mounting hole a of one panel and forcibly inserting the female member into the mounting hole b of the other panel.

This method of preliminarily coupling together the two, i.e. male and female, members is advantageous from the standpoint of product management. Besides, by merely forcing one panel, a large number of female members can be fitted in the other panel. Further, in a small operating space the panel A can be installed without need of extending the hand into the small space but by merely forcing the panel. Further, in the case of the method of preliminarily coupling together the two members, the elastic locking pawl portions 7 of the female member are flexed as the female member is inserted through the mounting hole b independently of and without at all influencing the locking body portion 6 in which the locking shaft portion 4 is received. Thus, the female member can be fitted very smoothly just as in the case when it is fitted alone.

Further, in the above embodiment the locking body portion of the female member is provided with the recesses 13 into which the locking pawl portions are flexed when the female member is inserted through the mounting hole of the panel. While these recesses are advantageous in enhancing the insertion property, they are also advantageous for making the outer diameter of the locking pawl portion close to the diameter of the mounting hole a of the panel so as to obtain stability after the fitting of the female member in the panel.

Further, while in the above embodiment the female member is provided with a diametrically opposed pair of locking pawl portions, it is also possible to provide three or more locking pawl portions.

What is claimed is:

1. A fastener for coupling together two panels in a face-to-face relation to each other comprising a male member to be fitted in one of said panels and a female member to be fitted in the other one of said panels, said male member having a head portion to be fitted in a mounting hole of said one panel and a locking shaft portion depending from the lower surface of said head portion, said female member having a mounting flange for regulating the extent of insertion into a mounting hole in said other panel, a hollow locking body portion depending downwardly from said mounting flange and having a blind space and locking means to lock said female member with respect to said mounting hole, said two members being coupled together to couple together said two panels in the face-to-face relation to each other, said locking means consisting of a plurality of locking pawl portions each being provided like a door on the outer periphery of said locking body portion and extending substanially tangentially from said female body member via a reduced thickness hinge portion extending in the longitudinal direction of said locking body portion outer periphery, each said locking pawl portion having a rectangular portion of predetermined length axially of said female member and a tapered lead-in portion of greater axial extent than said predetermined length extending from a free end portion, said tapered portion including a first portion of shallow taper leading from said end portion and connected by a smooth outwardly concave curve to a more steeply tapered portion extending to said rectangular portion, said rectangular portion having a top engagement edge facing the lower surface of said mounting flange.

2. A fastener as set forth in claim 1 wherein said male member locking shaft portion is of uniform diameter and of a length substantially greater than said diameter, said female member fitting in close conformity to said elongated shaft portion.

* * * * *